(12) United States Patent
Allen et al.

(10) Patent No.: US 7,562,344 B1
(45) Date of Patent: Jul. 14, 2009

(54) METHOD, SYSTEM, AND COMPUTER PROGRAM PRODUCT FOR PROVIDING REAL-TIME DEVELOPER FEEDBACK IN AN INTEGRATED DEVELOPMENT ENVIRONMENT

(75) Inventors: Corville O. Allen, Morrisville, NC (US); Albert A. Chung, Cary, NC (US); Binh Truong, Cary, NC (US); Kam K. Yee, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/111,304

(22) Filed: Apr. 29, 2008

(51) Int. Cl.
G06F 9/44 (2006.01)
G06F 9/45 (2006.01)

(52) U.S. Cl. .................. 717/113; 717/100; 717/110; 717/112; 717/142

(58) Field of Classification Search .................. 717/100, 717/106–113, 124–135, 140–143
See application file for complete search history.

(56) References Cited

U.S. PATENT DOCUMENTS

| | | | | |
|---|---|---|---|---|
| 4,751,635 | A * | 6/1988 | Kret | 707/10 |
| 5,548,718 | A * | 8/1996 | Siegel et al. | 714/38 |
| 5,754,737 | A * | 5/1998 | Gipson | 706/11 |
| 5,778,402 | A * | 7/1998 | Gipson | 715/201 |
| 5,960,196 | A * | 9/1999 | Carrier et al. | 717/122 |
| 6,016,467 | A * | 1/2000 | Newsted et al. | 704/9 |
| 6,026,233 | A * | 2/2000 | Shulman et al. | 717/113 |
| 6,305,008 | B1 * | 10/2001 | Vaidyanathan et al. | 717/111 |
| 6,314,559 | B1 * | 11/2001 | Sollich | 717/111 |
| 6,467,081 | B2 * | 10/2002 | Vaidyanathan et al. | 717/123 |
| 6,502,233 | B1 * | 12/2002 | Vaidyanathan et al. | 717/101 |
| 6,820,075 | B2 * | 11/2004 | Shanahan et al. | 707/3 |

(Continued)

FOREIGN PATENT DOCUMENTS

WO WO-2007/041242 A2 * 4/2007

OTHER PUBLICATIONS

Arthur, Lowell Jay, "Software productivity and quality measurement," Oct. 1985, ACM, p. 187-192.*

(Continued)

*Primary Examiner*—Wei Y. Zhen
*Assistant Examiner*—Qing Chen
(74) *Attorney, Agent, or Firm*—Cantor Colburn LLP; Joseph Bracken

(57) ABSTRACT

A system, method, and computer program product for providing real-time developer feedback are provided. The system includes a computer executing a source code editor; a feedback repository storing a programming language (PL) construct database, a profile database, and a general database; and a lexical analyzer executing on the computer. The analyzer parses code entered by a user into the editor. The constructs are used to search the construct database to determine a PL used in entering the code. The PL is used to search the construct database to determine a construct type. The analyzer searches the profile database for a developer profile of the user for the construct type. In response to a hit resulting from the search of the developer profile, the analyzer determines a frequency of occurrence of the construct type associated with the hit, identifies a cue assigned to the frequency of occurrence for the construct type, and delivers the cue to the computer.

1 Claim, 4 Drawing Sheets

U.S. PATENT DOCUMENTS

| | | | |
|---|---|---|---|
| 6,965,990 B2* | 11/2005 | Barsness et al. | 713/1 |
| 7,272,823 B2* | 9/2007 | Ball | 717/125 |
| 7,296,264 B2* | 11/2007 | Zatloukal et al. | 717/143 |
| 7,313,784 B2* | 12/2007 | Hawley et al. | 717/110 |
| 7,322,023 B2* | 1/2008 | Shulman et al. | 717/112 |
| 7,373,634 B2* | 5/2008 | Hawley et al. | 717/110 |
| 7,451,439 B2* | 11/2008 | Nickell et al. | 717/159 |
| 7,464,119 B1* | 12/2008 | Akram et al. | 707/202 |
| 2002/0016953 A1 | 2/2002 | Sollich | |
| 2002/0095657 A1* | 7/2002 | Vaidyanathan et al. | 717/110 |
| 2004/0003335 A1* | 1/2004 | Gertz et al. | 714/758 |
| 2004/0040014 A1* | 2/2004 | Ball | 717/130 |
| 2004/0153995 A1* | 8/2004 | Polonovski | 717/113 |
| 2004/0199904 A1* | 10/2004 | Schmidt | 717/130 |
| 2004/0230964 A1* | 11/2004 | Waugh et al. | 717/168 |
| 2005/0015747 A1* | 1/2005 | Zatloukal et al. | 717/109 |
| 2005/0114771 A1 | 5/2005 | Piehler et al. | |
| 2005/0125767 A1* | 6/2005 | Hawley et al. | 717/100 |
| 2005/0125773 A1* | 6/2005 | Hawley et al. | 717/109 |
| 2005/0289503 A1* | 12/2005 | Clifford | 717/101 |
| 2006/0277525 A1* | 12/2006 | Najmabadi et al. | 717/106 |
| 2007/0168946 A1* | 7/2007 | Drissi et al. | 717/110 |
| 2007/0226546 A1* | 9/2007 | Asthana et al. | 714/47 |
| 2007/0250816 A1* | 10/2007 | Rose | 717/124 |
| 2007/0288910 A1* | 12/2007 | Bhat et al. | 717/140 |
| 2008/0155508 A1* | 6/2008 | Sarkar et al. | 717/126 |
| 2008/0184209 A1* | 7/2008 | LaFrance-Linden | 717/130 |
| 2008/0189688 A1* | 8/2008 | Schmidt | 717/128 |

OTHER PUBLICATIONS

Tracz, Will, "Personal Personnel Programmer Profile," Mar. 1987, ACM, p. 119-120.*

Duncan, Anne Smith, "Software development productivity tools and metrics," Apr. 1988, IEEE, p. 41-48.*

Odekirk-Hash et al., "Automated Feedback on Programs Means Students Need Less Help From Teachers," Feb. 2001, ACM, pp. 55-59.*

Bhattacharya et al., "Real-Time Complexity Metric Tools for VisualAge Smalltalk and C++," Nov. 1996, IBM Press.*

Aggarwal, K. K., "A Tool for the Collection of Industrial Software Metrics Data," Mar. 1997, ACM, p. 54-57.*

Lange et al., "Using Code Metric Histograms and Genetic Algorithms to Perform Author Identification for Software Forensics," Jul. 2007, ACM, p. 2082-2089.*

* cited by examiner

METHOD, SYSTEM, AND COMPUTER PROGRAM PRODUCT FOR PROVIDING REAL-TIME DEVELOPER FEEDBACK IN AN INTEGRATED DEVELOPMENT ENVIRONMENT

BACKGROUND OF THE INVENTION

1. Field of the Invention

This invention relates to program development, and particularly to a method, system, and computer program product for providing real-time developer feedback in an integrated development environment.

2. Description of Background

Currently, new and less experienced software developers are expected to learn, keep up with, and adapt to the accelerated pace of a programming environment. In many instances, programmers are required to self-train with respect to a given project. A common challenge that new programmers face is how to avoid repeating common programming errors without having to wait for peer code reviews and before receiving defect reports from the field.

What is needed, therefore, is a way to provide real-time feedback to program developers during the program writing process for assisting the programmers in learning the job, as well as avoiding common or repeatable errors.

SUMMARY OF THE INVENTION

The shortcomings of the prior art are overcome and additional advantages are provided through the provision of a system, method, and computer program product for providing real-time developer feedback. The system includes a computer executing a source code editor; a feedback repository storing a programming language (PL) construct database, a profile database, and a general database; and a lexical analyzer executing on the computer. The analyzer parses code entered by a user into the editor. The constructs are used to search the construct database to determine a PL used in entering the code. The PL is used to search the construct database to determine a construct type. The analyzer searches the profile database for a developer profile of the user for the construct type. In response to a hit resulting from the search of the developer profile, the analyzer determines a frequency of occurrence of the construct type associated with the hit, identifies a cue assigned to the frequency of occurrence for the construct type, and delivers the cue to the computer.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that provides real-time, programmer-specific and general feedback, which is based on historical data that is relevant to the tasks being performed. The historical data is aggregated and organized to provide indicators and suggestions to guide the programmer during development. Rule-based filtering and heuristics define how and when the programmer is notified of a possible infraction, which can dramatically reduce the number of defects originating from code and increase quality and developer knowledge.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments of the invention are directed to a method, system, and computer program product for providing real-time, programmer-specific and general feedback, which is based on historical data that is relevant to the tasks being performed. The historical data is aggregated and organized to provide indicators and suggestions to guide the programmer during development. Rule-based filtering and heuristics define how and when the programmer is notified of a possible infraction, which can dramatically reduce the number of defects originating from code and increase quality and developer knowledge.

An exemplary embodiment of the invention discloses a mechanism for software developers to get real-time feedback on their most common programming mistakes while in the actual process of writing code. This mechanism promotes self-learning (from previous mistakes), and prevents these commonly made coding mistakes from being made in the first place, thereby decreasing the number of defects found during the verification cycle and increasing overall product quality delivery.

There are historical data which can be gathered through the lifetime of a product's development and this data can be used to guide other developers. Some of these data can come from data inputs, such as: orthogonal defect classification results, a defect tracking system, automated code reviews and team code reviews, historical compilation errors, and a source control system, to name a few.

Figure 1:
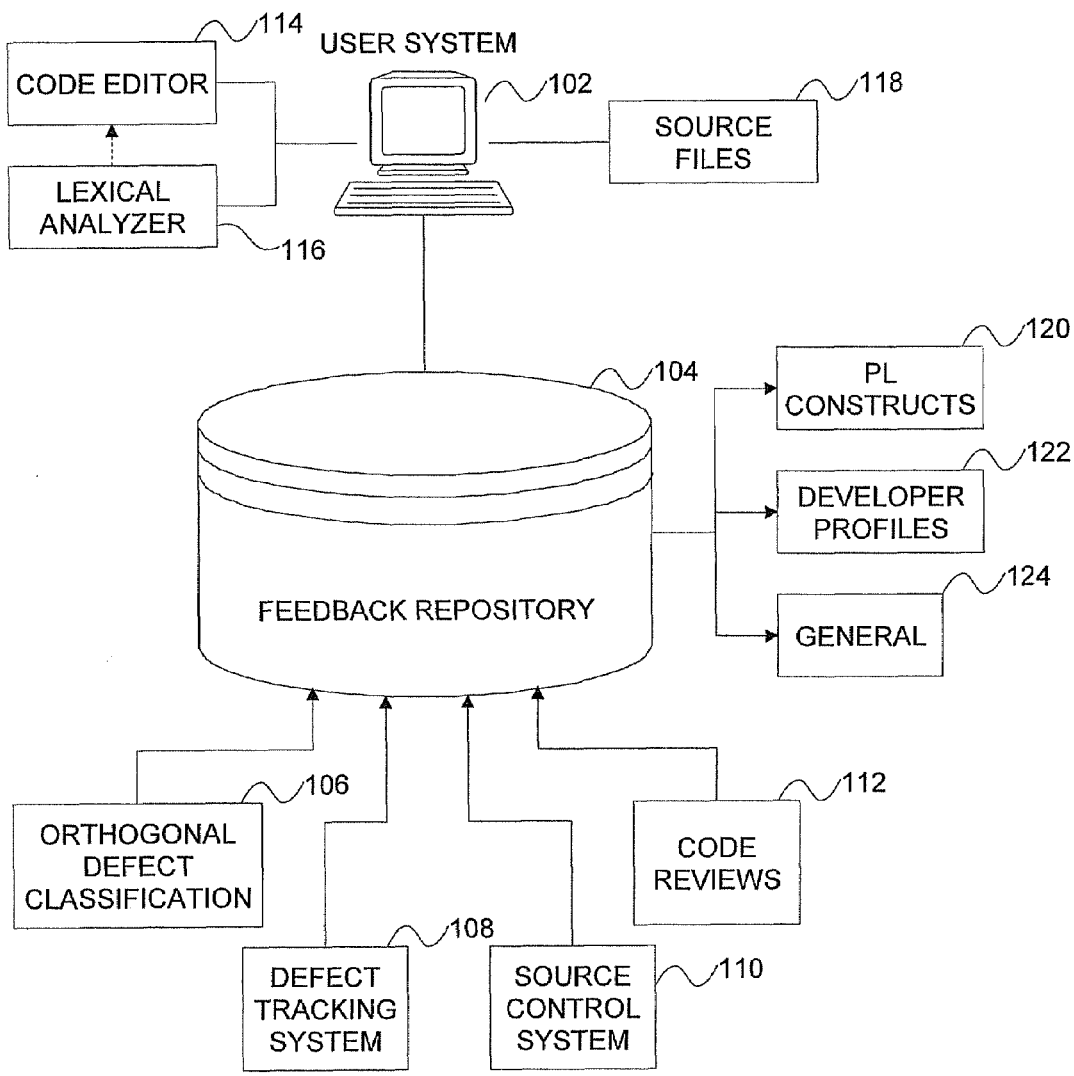
FIG. 1 depicts a block diagram of a system upon which real-time program developer feedback may be implemented in an exemplary embodiment.

Turning now to the system of FIG. 1, a user system 102 is in communication with a feedback repository 104. The user system 102 may be implemented using a general-purpose computer executing a computer program for carrying out various processes associated with an integrated development environment (IDE). The user system 102 may be a personal computer (e.g., a lap top, a personal digital assistant) or a host-attached terminal. In an exemplary embodiment, the user system 102 executes a source code editor 114 and also stores source files 118 created by the source code editor 114. The source code editor 114 enables a programmer (e.g., a user of user system 102) to edit source code of a computer program. The source code editor 114 may be a standalone application or may be built into an integrated development environment (IDE). In an exemplary embodiment, the source code editor 114 is in communication with a lexical analyzer 116, which converts sequences of characters input by the programmer into sequences of tokens, or constructs. A token refers to a categorized block of text made up of characters. In an exemplary embodiment, the lexical analyzer 116 includes logic for providing the real-time programmer feedback as described further herein. The lexical analyzer 116 may be a separate application from the source code editor 114 or may be integrated into the source code editor 114, e.g., as a plug-in.

The feedback repository 104 includes data repositories with databases relating to information used in by the IDE and may be implemented using a variety of devices for storing electronic information. It is understood that the feedback repository 104 may be implemented using memory contained in one or more computer devices or that it may be comprised of separate physical devices. The feedback repository 104 may be logically addressable as a consolidated data source across a distributed environment that includes the user system 102. Information stored in the feedback repository 104 may be retrieved and manipulated via the user system 102. In an exemplary embodiment, the feedback repository 104 processes data from various information sources (e.g., sources 106, 108, 110, and 112). These sources of information are used by the lexical analyzer 116 to provide real-time programmer feedback. Orthogonal defect classification (ODC) techniques may be used to identify defect types and categories. The results of these techniques are stored in orthogonal defect classification database 106. A defect tracking system may be employed as part of the programming environment of FIG. 1. The defect tracking system may be used to report and track defect information (e.g., defect counts, defect density, and time-based data), which may be used to project or estimate overall/future defects. This information is stored in defect tracking system database 108. In addition, the defect tracking system may be used in conjunction with the orthogonal defect classification tool to detect the ODC type of the current line of code prepared by the programmer and obtaining the list of defects that contains this ODC type. Each defect maps to a list of files that were updated for the defect. This file list is an historical view of changes for a particular ODC type, which can be used to inform the user of previous problem areas that are related to the current line of code, as described further herein.

A source control system may be employed by the programming environment to identify and track versions of source code applications for a development project. This information is stored in source control system 110. In addition, code reviews may be conducted by members of the programming environment. The code reviews may be automated, e.g., via a tool which checks source code against a set of rules based on the runtime environment or development rules. Alternatively, or in addition thereto, the programming environment may implement team/peer code reviews. This information is stored in code review database 112. These, and other, types of information sources may be utilized in implementing the real-time programmer feedback processes.

The information sources 106, 108, 110, and 112 are processed by the lexical analyzer 116 (in part) to produce databases of information referred to as programming language (PL) constructs database 120, developer profiles database 122, and general database 124. The information sources assist in tracking the defects attributed to a particular developer, which is then used to assess the frequency of occurrence of the defects in proportion to the number of times the construct associated with the defects is used. This process is described further herein.

The PL constructs database 120 stores a comprehensive list of PL constructs (e.g., assignment, condition checking, iteration, counter increase, etc.). There may be separate databases for each programming language used by the IDE of the system of FIG. 1. Each of the constructs in the list has associated with it a reference to one or more entries in the general database 124. These references constitute the generic feedback that may be displayed for a particular language construct.

Figure 3:
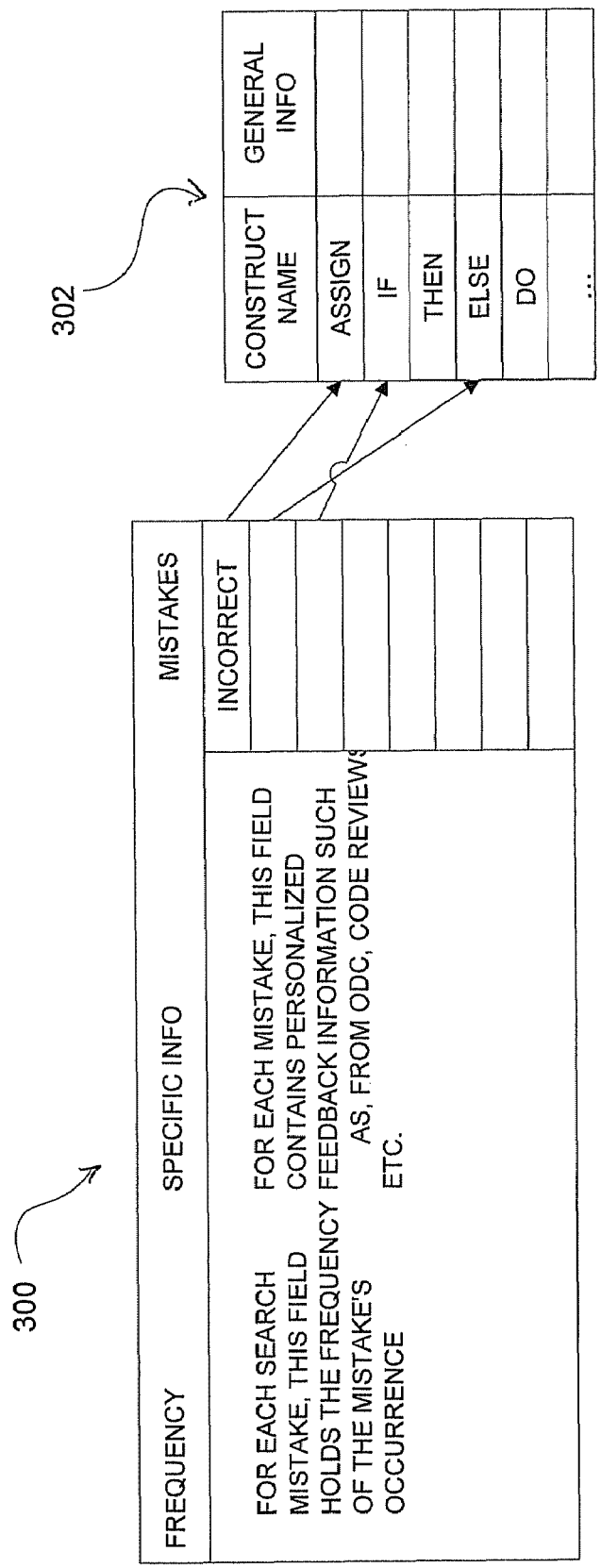
FIG. 3 illustrates one example of a developer profile record created via the system of FIG. 1 in an exemplary embodiment.

The developer profile database 122 contains lists which reference the list in PL database 120. These lists represent developer profiles and indicate the mistakes most frequently made by the developer (i.e., developer-specific information). A sample developer profile record 300 is shown and described in FIG. 3. The profile record 300 includes a list which reference the list in PL database 120, as indicated by the arrows from profile record 300 to a PL database list 302 shown in FIG. 3. Each of the references in a developer's profile has associated with it a frequency value that represents the frequency at which the developer makes a particular mistake. Each of the references may also have associated with it other information about that is specifically relevant to the developer, such as hints and tips that are of particular interest to the developer. Information stored in profile database 122 is populated over time as the developer makes mistakes and they are identified. As indicated above, the information stored in the profile database 122 maybe derived from one or more of the information sources 106, 108, 110, and 112.

General database 124 stores a comprehensive list of general hints and tips, best practices, standard specification information applicable to each of the programming languages and their corresponding constructs, which are used by the IDE of FIG. 1. There may be a separate database for each programming language used in the IDE of FIG. 1.

Figure 2:
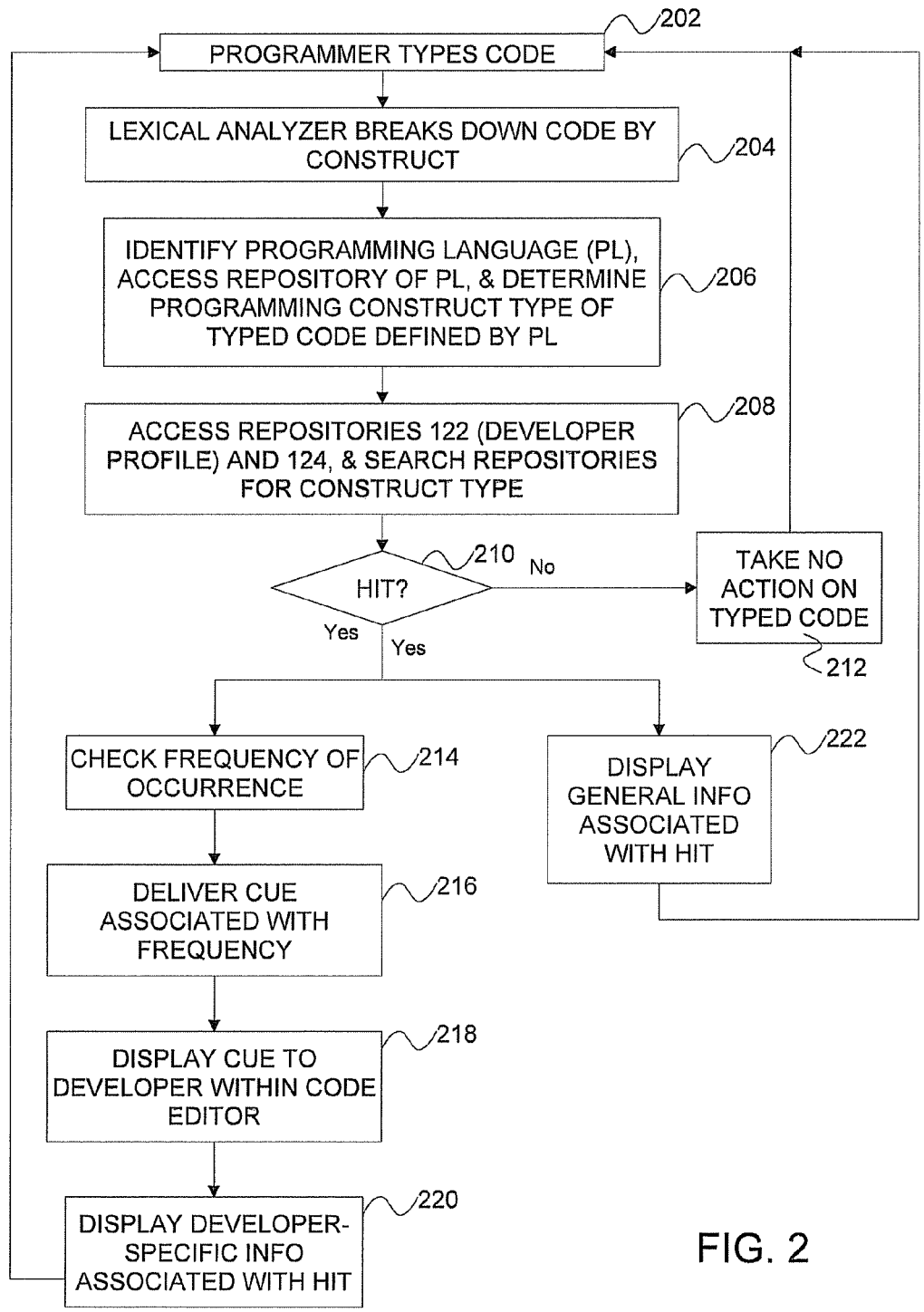
FIG. 2 is a flow diagram describing a process for providing real-time program developer feedback in an exemplary embodiment.

Turning now to FIG. 2, a flow diagram describing a process for providing real-time developer feedback will now be described. Prior to implementation, the system of FIG. 1 may be placed in a non-initialized state. In this state, databases 120 and 124 will have already been populated with the programming language-specific constructs (database 120) and the list of generic feedback information (database 124). As indicated above, information for database 122 may be populated over time for each developer as he/she makes errors during coding. When the source code editor 114 is launched, the databases 120, 122, and 124 may be loaded into memory of user system 102 for improved responsiveness and performance.

At step 202, the developer enters code via the source code editor 114 and user system 102. The lexical analyzer 116 breaks down the source code to examine the kinds of constructs within the line currently being typed at step 204. At step 206, the lexical analyzer 116 identifies the programming language for the construct being typed, accesses the PL database 120 for the programming language, and determines the programming construct type defined for the programming language. The lexical analyzer 116 is configured to track the number of times the developer uses each construct. This information is used in conjunction with the defects tracked (e.g., via databases 106/108) to assess the relative frequency of occurrence. This frequency is stored in the developer's profile in database 122 and is updated as the developer continues to enter code.

Using the construct type, the lexical analyzer 116 accesses the developer profile database 122 and the general database 124 and searches these databases 122 and 124 for the construct type at step 208. The search in the developer profile database 122 (in particular, the profile specific to the developer) is performed to determine whether the developer is writing code in the area where he/she commonly makes mistakes. For example, the developer could be writing a line of code where a variable is being assigned to another variable (e.g., myNewValue=myOldValue), and the profile in database 122 has an entry that identifies that this particular developer has historically made mistakes in assigning variables.

If there is no match at step 210, the lexical analyzer 116 takes no further action at step 212 and the programmer continues to enter code via the source code editor 114. Otherwise, if there is a match at step 210, one or both of two paths may be followed as will now be described. If the hit is in the developer profile database 122 only, then steps 214-220 are performed. If the hit is in the general database 124 only, then step 222 is performed. If the hit is in both databases 122 and 124, then both paths are followed.

If the hit is in the developer profile database 122, the lexical analyzer 116 checks the developer profile in database 122 to determine the frequency of the occurrence of mistake that is identified by the hit at step 214. In an exemplary embodiment, the frequency determines what type of cue will be presented to the developer. For example, if the frequency is relatively high, the line of code being written may be highlighted in red. A medium range frequency may result in the line of code being highlighted in yellow. The frequency level determinations (i.e., high versus medium) may be defined by members of the IDE of FIG. 1 via the lexical analyzer 116. In addition, if audio feedback is enabled, the lexical analyzer 116 may play unique sound bites associated with each of the frequency levels. Alternatively, various symbols/icons may be used to identify the code in which a hit has occurred (e.g., in FIG. 4, an arrow is used to identify the code). Thus, the cue may be in the form of visual cues, such as color-coding of text and symbols, and audio cues, such as sound bites, text-to-speech information. At step 216, the cue associated with the frequency is delivered to the user system 102 and displayed to the developer via the code editor 114 at step 218. In addition, at step 220, developer-specific information about the error (relating to the hit) is presented to the developer and is described below. If more than one construct within the line being coded match entries in the feedback repository 104, they all may be addressed together on the user system screen. That is, the developer-specific and generic information pertaining to all of the matched errors may be displayed. Alternatively, the audio/visual cues may be based on a "worse-case in the set" approach. For example, if two constructs in the current line of code are matched, and one mistake is of medium frequency and the other is of high frequency, only the information relating to the high frequency error may be presented to the developer. The process then returns to step 202.

Turning back to step 210, if the hit is in the general database 124, the lexical analyzer 116 retrieves the associated information stored in the general database that relates to the hit, and presents the information to the developer at step 222 and is described below. The process then returns to step 202.

Figure 4:
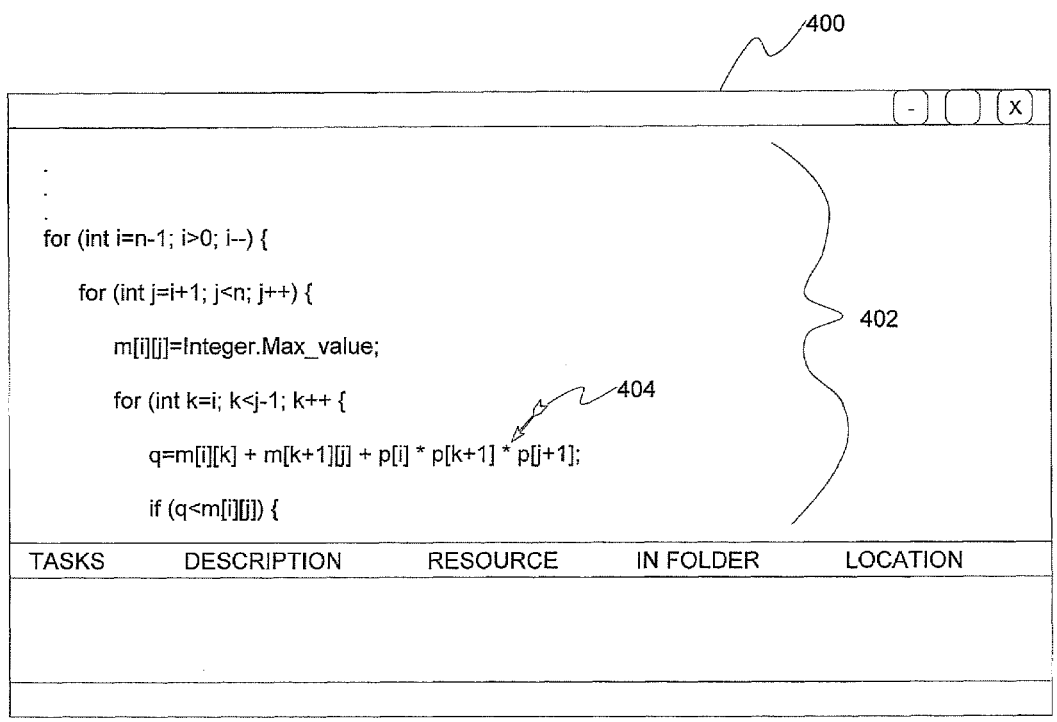
FIG. 4 illustrates one example of a computer screen window including programmer feedback in an exemplary embodiment.

A sample computer screen window 400 illustrating a portion of code 402 entered by the developer via the user system 102 is shown in FIG. 4. The code 402 includes an arrow 404 pointing to an item of the code in which a hit occurred. The developer may select the item to which the arrow is pointed in order to receive results of the searches performed and described in FIG. 2, which may be displayed directly on the computer screen of user system 102. For example, the following information may be displayed to the developer where the construct type is ASSIGN:

From the developer profile:

| Personalized info | Mistake | Occurrence | Frequency |
|---|---|---|---|
| Right operand constant | Assign -incorrect | 10 | HIGH Medium Low |

From the general database 124:

| Construct name | General Info |
|---|---|
| Assign | Do not confuse "=" and "==" equality Indicator |

In an alternative embodiment, the data from the developer profiles may be aggregated across the integrated development environment in which the information provided to the developer during code writing is specific to a group of developers whose defect data is aggregated from one or more of the information sources of databases 106, 108, 110, and 112.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A system for providing real-time developer feedback in an integrated development environment, comprising:
    a computer device executing a source code editor;
    a feedback repository in communication with the computer device, the feedback repository storing a programming language construct database, a developer profile database, and a general database; and
    a lexical analyzer executing on the computer device and in communication with the source code editor, the lexical analyzer providing real-time developer feedback by performing a method, comprising:
        parsing code entered into the source code editor by a user of the computer device, the code parsed into constructs as the code is typed into the source code editor;

using the constructs to search the programming language construct database to determine a programming language used in entering the code, the programming language construct database storing programming language constructs for each of a plurality of programming languages used in the integrated development environment;

using the programming language to search the programming language construct database to determine a construct type of the constructs;

searching a developer profile database for a developer profile of the user for the construct type, the developer profile storing a frequency of occurrence for constructs historically entered by, and specific to, the user in which an error occurred; and in response to a hit resulting from the search of the developer profile:

determining a frequency of occurrence of the construct type associated with the hit;

identifying a visual cue assigned to the frequency of occurrence of the construct type and delivering the visual cue to the computer device, the visual cue displayed on a computer screen window in which the code entered by the user is displayed;

retrieving information relating to the construct type from the general database that includes tips about errors associated with the construct type in order to avoid making the errors; and displaying the information on the computer device;

wherein frequencies of occurrence are categorized by high frequency, medium frequency, and low frequency, the frequencies of occurrence defined by members of the integrated development environment via the lexical analyzer.

* * * * *